(12) United States Patent
Noda

(10) Patent No.: US 6,267,517 B1
(45) Date of Patent: Jul. 31, 2001

(54) BANNER PAGE OUTPUTTING METHOD AND PRINTER USING THIS METHOD AND PRINTER SYSTEM USING THIS METHOD

(75) Inventor: Ken-Ichi Noda, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/572,208

(22) Filed: May 17, 2000

(30) Foreign Application Priority Data

May 19, 1999 (JP) .................................................. 11-138975

(51) Int. Cl.[7] .............................. B41J 11/44; B41J 3/42; B41J 5/30
(52) U.S. Cl. .................................. 400/76; 400/61; 400/70
(58) Field of Search .................................. 400/76, 70, 61

(56) References Cited

U.S. PATENT DOCUMENTS

| | | | | |
|---|---|---|---|---|
| 5,547,178 | * | 8/1996 | Costello | 270/52.02 |
| 5,869,824 | * | 2/1999 | Okada et al. | 235/380 |
| 6,075,617 | * | 6/2000 | Fischer et al. | 358/1.16 |

FOREIGN PATENT DOCUMENTS

| | | | |
|---|---|---|---|
| 0716372 | * | 6/1996 | (EP) . |
| 6-342349 | | 12/1994 | (JP) . |
| 7-156465 | | 6/1995 | (JP) . |
| 11-232069 | * | 8/1999 | (JP) . |

* cited by examiner

Primary Examiner—John S. Hilten
Assistant Examiner—Charles H. Nolan, Jr.
(74) Attorney, Agent, or Firm—Ostrolenk, Faber, Gerb & Soffen, LLP

(57) ABSTRACT

A banner page outputting method, at a printer which is connected to a network and is used by plural users in common, in which in case that plural print jobs of a user are outputted in succession and after the plural print jobs a print job of another user is outputted, the banner pages of users are printed out every user, is provided. A printer used this method provides a central processing unit (CPU) for processing print jobs from clients, a user information memorizing means for memorizing user information sending from the CPU via a bus, a user information comparing means for comparing the user information memorized at printing of previous time in the user information memorizing means with user information at printing of this time, a banner page controlling means for outputting a control signal which instructs to print a banner page including a user name, in case that the comparing result of the user information is different at the user information comparing means, and a printer engine which prints the print job including the banner page by an instruction of said CPU. And in case that the comparing result of the user information is the same at the user information comparing means, the banner page is not printed at said printing of this time.

17 Claims, 4 Drawing Sheets

F I G. 1
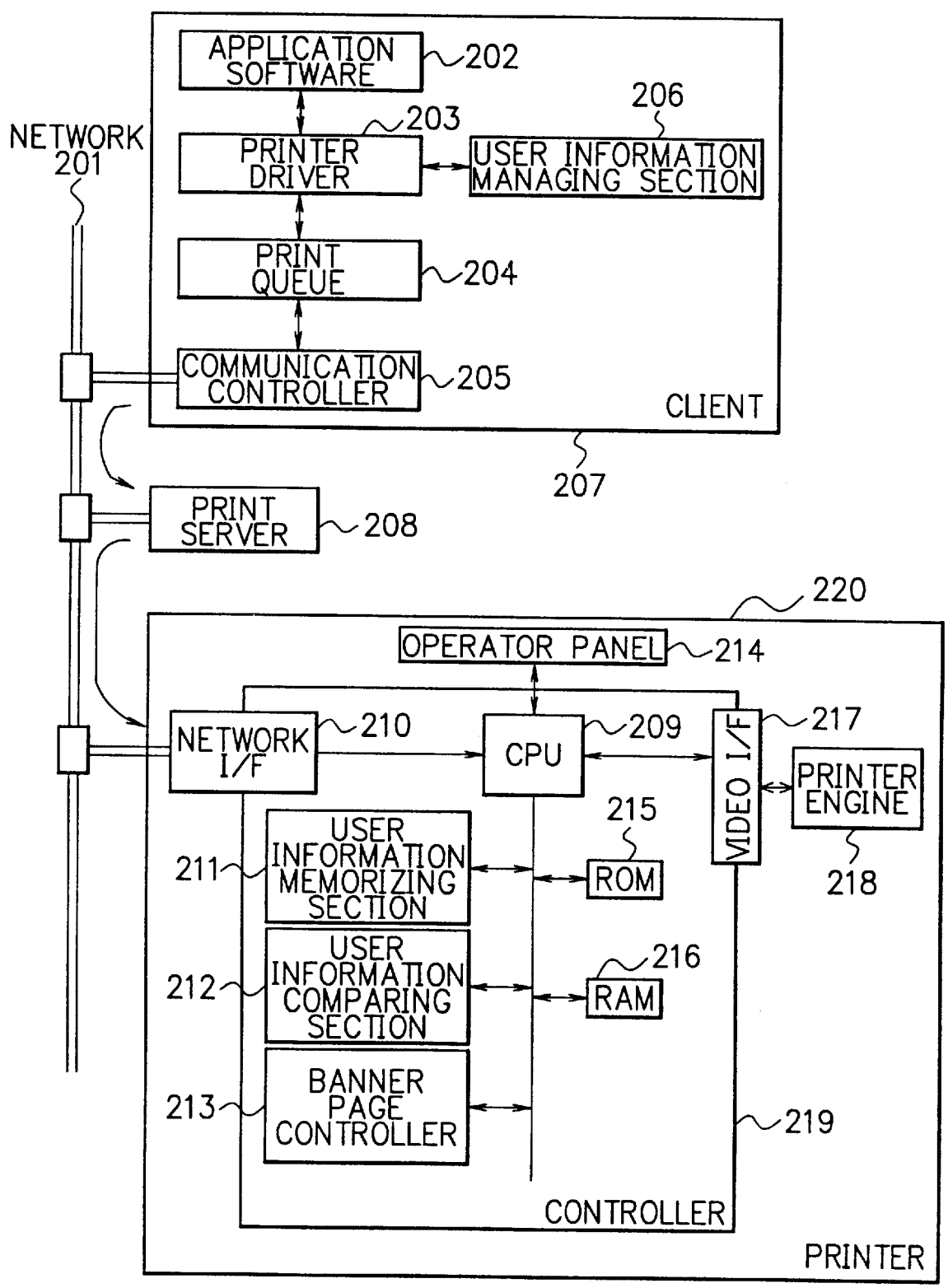

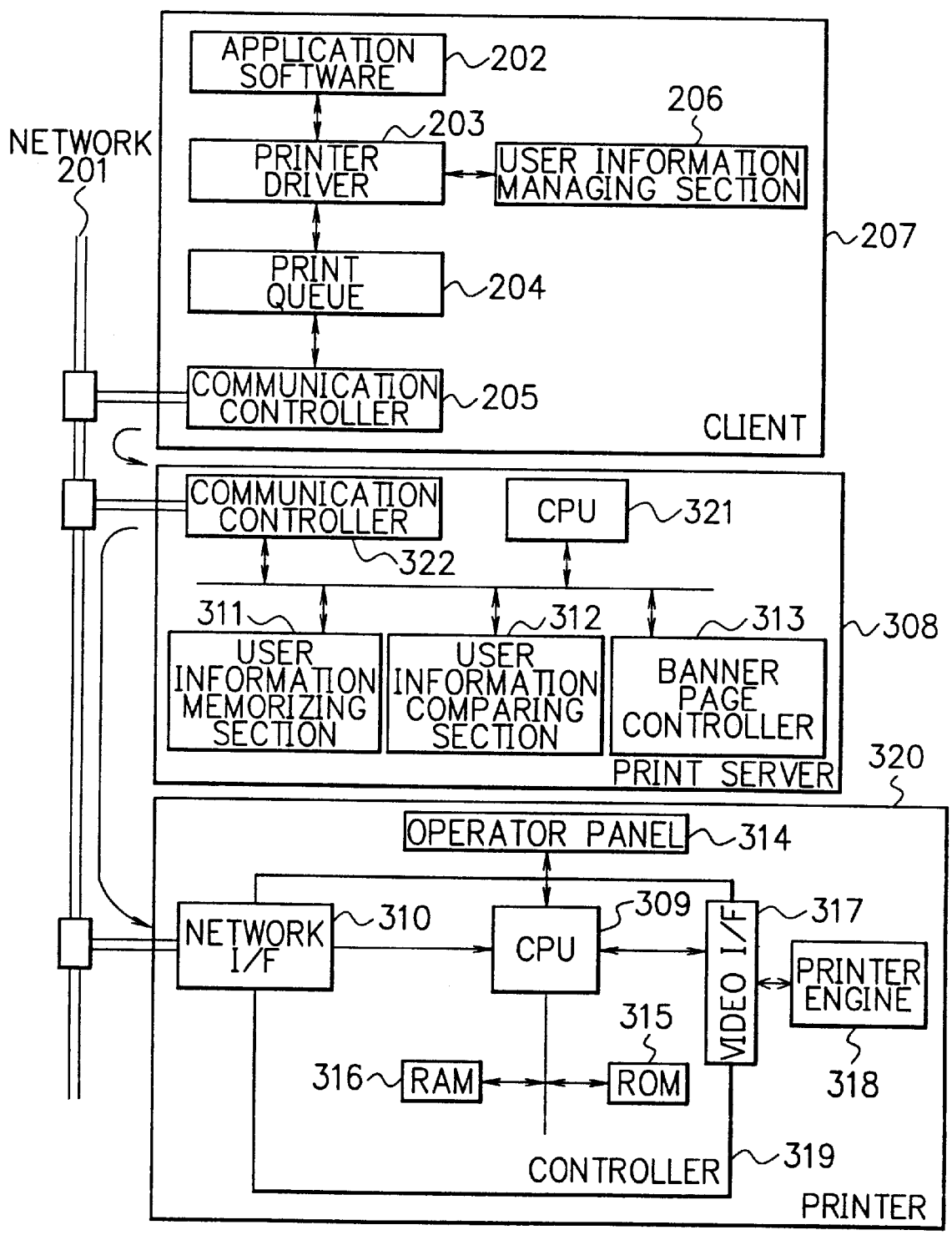

BANNER PAGE OUTPUTTING METHOD AND PRINTER USING THIS METHOD AND PRINTER SYSTEM USING THIS METHOD

BACKGROUND OF THE INVENTION

The present invention relates to a banner page outputting method, a printer using this method in a network, and a printer system using this method, in particular, which are used in case that a print request is instructed to a printer that is connected to a network such as a local area network (LAN), and a wide area network (WAN) as a terminal.

DESCRIPTION OF THE RELATED ART

Plural persons use a printer in common in a network and printed documents of the plural persons are outputted to a tray of the printer, consequently, it is inconvenient for persons to pick up their own printed documents. In order to solve this problem, Japanese Patent Application Laid-Open No. HEI 6-342349 discloses a network printer. In this application, a method, in which a paper for separating print jobs called "Banner" or "banner" having printed thereon the name of the user, is outputted between each of of the print jobs, is applied.

However, in case that the print jobs of a person are outputted in succession, printing out the banner page at each of the print jobs is not necessary, but the banner page is printed out for each of the plural print jobs. Especially, in case that print jobs having a several pages continue, the ratio of the banner pages to the all printed pages becomes high and the cost increases.

Japanese Patent Application Laid-Open No. HEI 7-156465 discloses a recording apparatus. In this application, in order not to use banner pages wastefully, this recording apparatus manages network address numbers and names of the host computers, and provides a printing means for printing each of the name of the host computers at the edge of the papers, and further provides a tray in which printed documents instructed by plural host computers are piled up in sequence for every host computer.

In this application, a user may recognize that the printed document is the one that the user instructed by confirming the name of the host computer printed at the edge of the printed document. However, the print instructions are not made by only one person, plural users can instruct the host computer their print jobs. Especially, in case that host computers use an operating system such as UNIX, a registered user can operate any host computer of the host computers by inputting his/her own identification (ID) number. And, after a time passes, another user may instructs a print job, in this case, the user can not distinguish whether the printed document is the one that the user instructed or not by only the printed name of the host computer.

SUMMARY OF THE INVENTION

It is therefore an object of the present invention to provide a banner page outputting method, a printer using this method, and a printer system using this method, in which a banner page is printed for every user even in case that plural print jobs of a user are outputted in succession, at a printer used in common connected to a network.

According to a first aspect of the present invention for achieving the object mentioned above, there is provided a banner page outputting method, in a network printer, in case that a banner page is outputted for a printer connected to a network, wherein; in case that a user instructs plural print jobs in succession in a designated time, said banner page is outputted in the first print job and is not printed in the other print jobs, and in case that another user instructs a print job after said user, a banner page is outputted in the print job of another user.

According to a second aspect of the present invention, in the first aspect, even in case that said user instructs plural print jobs in succession, when a variable designated time passed between each of said plural print jobs, said plural print jobs are judged as individual print jobs respectively, and said banner page is outputted each of said plural print jobs, the same as said print job of another user.

According to a third aspect of the present invention, in the first and second aspects said banner page is outputted on one page front of said print job.

According to a fourth aspect of the present invention, in the first and second aspects, a name of said user or another user is printed at the edge of the first page of said print job as said banner page, instead of outputting said banner page.

According to a fifth aspect of the present invention, in the first and second aspects, a name of said user or another user is printed at the edge of the last page of said print job or after the final data of said print job as said banner page, instead of outputting said banner page.

According to sixth aspect of the present invention, there is provided a printer, which is connected to a network and is used by plural users in common, including a central processing unit (CPU) for processing print jobs from clients, a user information memorizing means for memorizing user information sent from said CPU via a bus, a user information comparing means for comparing said user information memorized at printing of previous time in said user information memorizing means with user information at printing of this time, a banner page controlling means for outputting a control signal which instructs to print a banner page including a user name, in case that the comparing result of the user information is different at said user information comparing means, and a printer engine which prints said print job including said banner page by an instruction of said CPU, and in case that the comparing result of the user information is the same at said user information comparing means, said banner page is not printed at said printing of this time.

According to a seventh aspect of the present invention, in the sixth aspect, a printer further provides a time interval managing means, which is connected to said CPU via said bus, counts a storing time of said user information memorized in said user information memorizing means, and a time interval setting means for setting said storing time as a time interval, and said time interval is variable by the instruction of users, and said user information memorized in said user information memorizing means is deleted from said user information memorizing means after said time interval passed.

According to an eighth aspect of the present invention, there is provided a printer system, which provides a print server and a printer and is connected to a network and is used by plural users in common via said network. The print server provides a CPU for processing print jobs from clients, a user information memorizing means for memorizing user information sending from said CPU via a bus, a user information comparing means for comparing said user information memorized at printing of previous time in said user information memorizing means with user information at printing of this time, and a banner page controlling means for outputting a control signal which instructs to print a banner page including a user name, in case that the comparing result of the user information is different at said user information comparing means. And said printer provides a CPU for controlling printing operation of said printer corresponding to a printing instruction from said print server, and a printer engine which prints said print job by an instruction of said main processing means. And in case that the comparing result of the user information is the same at said user information comparing means, said banner page is not printed at said printing of this time, and further, said user information memorized in said user information memorizing section is deleted after a designated time passed, and said user information of said user is handled as the same as said user information of another user.

According to the present invention, in case that said user instructs to print plural print jobs in succession, said banner page is outputted only on the first print job of said plural print jobs, and in case that another user instruct to print a print job, the banner page is outputted, therefore, an unnecessary banner page is not outputted.

According to the present invention, a user confirming function is newly added. Print jobs including user information are formed at a printer driver in said client and are sent to said printer. Said printer judges whether the user of the current print job is the same as that of a newly sent print job or not. In case that the user is the same, the banner page is not printed on the newly sent print job. In case that the user is not the same, that is, another user instructed the newly sent print job, the banner page is printed on the newly sent print job. However, even in case that the user instructs plural print jobs in succession, when a designated time interval exists between each of said plural print jobs, the banner page is outputted on one page front of each print jobs. In this, said designated time interval can be arbitrary changed.

BRIEF DESCRIPTION OF THE DRAWINGS

The objects and features of the present invention will become more apparent from the consideration of the following detailed description taken in conjunction with the accompanying drawings in which:

FIG. 1 is a block diagram showing a structure of a first embodiment of a printer system of the present invention;

FIG. 4 is a block diagram showing a structure of a second embodiment of a printer system of the present invention.

DESCRIPTION OF THE PREFERRED EMBODIMENTS

Figure 2:
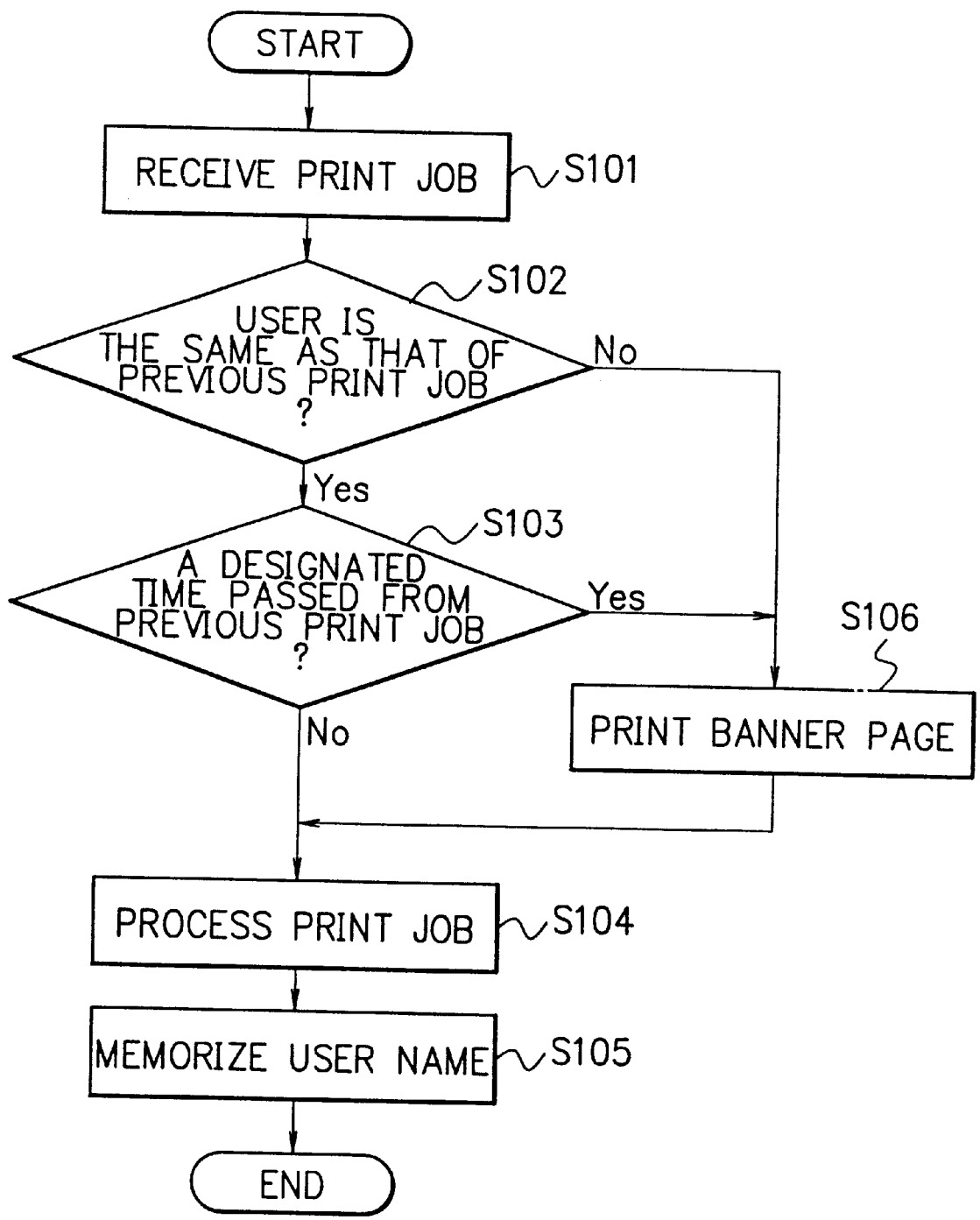
FIG. 2 is a flowchart showing a printing out operation of banner pages of the present invention.

Referring now to the drawings, embodiments of the present invention are explained in detail. FIG. 1 is a block diagram showing a structure of a first embodiment of a printer system of the present invention. As shown in FIG. 1, the printer system consists of a network 201, a client 207, which uses a banner page outputting method of the present invention, a print server 208, and a printer 220, Client 207, the print server 208, and the printer 220 are connected to the network 201. Alternatively, printer 220 maybe connected directly to the print server 208.

In this structure, the network 201 may be a local area network (LAN) or a wide area network (WAN) to which a plurality of clients 207 are connected. The clients 207 may be personal computers using an operating system such as Windows 95, or 98, operating systems of Microsoft Corporation. Windows and Microsoft are registered trademarks of Microsoft Corporation.

In the embodiments of the present invention, actually the plural clients 207 are connected to the network 201, however, in order to make the explanation simple, the case that one client 207 is connected to the network 201 is explained.

As shown in FIG. 1, the print server 208 and the printer 220 are connected to the network 201 in parallel, it may be considered that the client 207 instructs a print job directly to the printer 220. However, at the embodiments of the present invention, the case that the print server 208 works as a buffer between the client 207 and the printer 220 is explained, when the client 207 instructs the print job to the printer 220.

In FIG. 1, the client 207 consists of application software 202 with which a user inputs data and makes data to be printed by using functions in the client 207, a printer driver 203 which makes print jobs for the printer 220 from the data made by using the application software 202, a print queue 204 which stores data to be printed made at the printer driver 203 until the data to be printed are finished sending, a communication controller 205 which controls sending the data to be printed to the network 201, and a user information managing section 206 which manages the users using the client 207 and provides user information to the print job. This user information is an indispensable condition to be inputted when the user starts the client 207 in case that the client 207 is a UNIX type personal computer. In case that the client 207 is a Windows 95 or 98 type personal computer, the user information can be inputted to the client 207 when the user starts application software for printing out.

When the printer driver 203 makes the print job, the printer driver 203 requests the user information to be inputted to the print job, from the user information managing section 206. The user information managing section 206 passes the user information in the user information managing section 206 to the printer driver 203, and the printer driver 203 includes included the user information in the print job.

The printer 220 consists of an operator panel 214 on which a user operates, a printer engine 218 which is a printing mechanism of the printer 220, and a controller 219. The controller 219 consists of a central processing unit (CPU) 209, a ROM 215 in which programs for, operation of the printer engine 218, responding to a print instruction from the network 201, and a panel operation, are stored, a RAM 216 in which data to be printed is stored temporarily, a video interface (I/F) 217 which provides the data to be printed to the printer engine 218, a network interface (I/F) 210 for connecting to the network 201, a user information memorizing section 211 for memorizing the user information in the print job, a user information comparing section 212 which compares the user information memorized in the user information memorizing section 211 with the user information in the newly sent print job and a banner page controller 213 which generates a banner page including the user information.

Next, an operation of the first embodiment of the present invention is explained. When a user instructs a print job from the client 207, first, the print job is sent to the print server 208. This operation is explained in more detail. The printer driver 203 converts data made by the application software 202 to a print language and sets up the print job. The printer driver 203 requests user information from the user information managing section 206, and obtains the user information, adds the user name to the print job and sends the print job including the user name to the print queue 204. The communication controller 205 sends the print job with the user name to the print server 208. The print server 208 send print data of the print job including the user name to the printer 220.

In the embodiments of the present invention, the banner page is printed on one page front of each of the print jobs, in case that the banner page is needed.

FIG. 2 is a flowchart showing a printing out operation of banner pages of the present invention. First, the printer 220 receives a print job (step S101). The printer 220 has memorized user information of a user who instructed the previous print in the user information memorizing section 211. The user information of the incoming print job is compared with the user information of the print job user information comparing section 212 (step S102). In case that the previous and present users are not the same (No at the step S102), a banner page is generated by the banner page controller 213 and outputted (step S106).

In case that the present and previous users are the same (Yes at the step S102), when a time passed from the previous print job is longer than a designated time (Yes at step S103), it is assumed that printed documents of the previous print job is collected by the user, and a banner page is made at the banner page controller 213 and printed (the step S106). And in case that the user is the same (Yes at the step S102) and the time passed from the previous print job is shorter than the designated time, for example 10 minutes (No at the step S103), it is assumed that the user has not collected the printed documents of the previous print job, and the banner page is not printed on the print job of this time. In this, this designated 10 minutes can be changed by a system manager or users. After finishing the judgment of the banner page printing, if necessary the banner page is outputted, and the jobs are processed and the print printed (step S104). Finally the user information memorizing section 211 memorizes the user information of the user who sent the new print job of this time (step S105).

As mentioned above, in the embodiments of the present invention, the banner page is printed on one page front of each of the print jobs, in case that the banner page is needed. However, one page of the banner page having the user name can be printed after the printed documents of the print job is outputted, but, in this case, an additional one page for the banner page is printed. Instead of this, the user name can be printed on the edge of the final page of the print job. In this case, a person who distributes the printed documents can recognize users whom the printed documents belong to by taking out from the tray, and the additional page is not needed.

Figure 3:
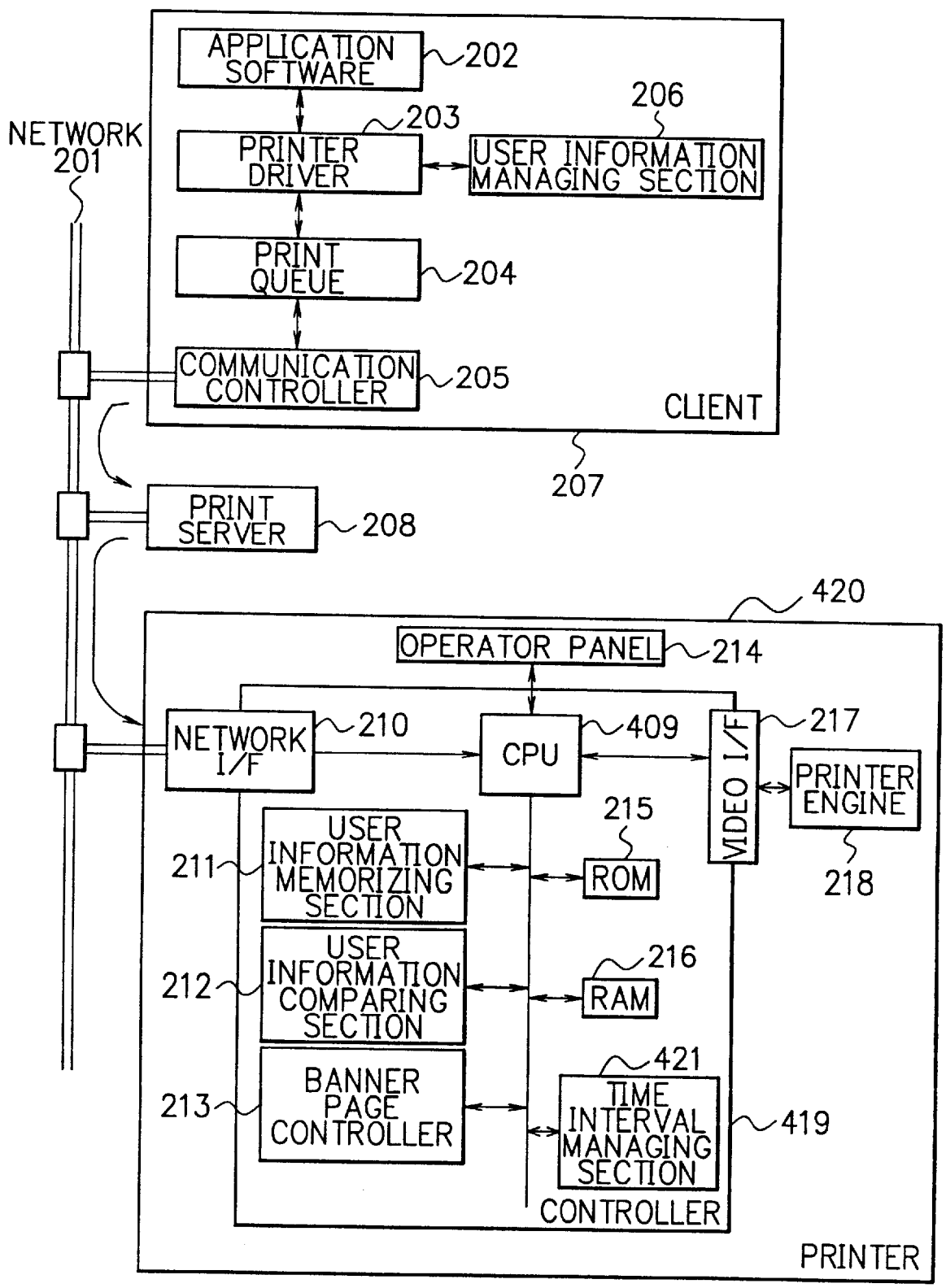
FIG. 3 is a block diagram showing a structure having a time interval managing function of a printer system of the present invention.

Next, a case that the change of the designated time interval between each of print jobs is explained. At the first embodiment, for example, 10 minutes is set as a designated time interval which is a passed time from the previous print job finished to this time print job starts. FIG. 3 is a block diagram showing a structure having a time interval managing function of a printer system of the present invention. As shown in FIG. 3, in order to change the designated time interval, a time interval managing section 421 is added to the first embodiment shown in FIG. 1. That is, the time interval managing section 421 is newly installed in a controller 419 of a printer 420, and connected to a CPU 409 via a bus. The other elements are the same as those of the first embodiment shown in FIG. 1, therefore, the redundant explanation is omitted.

The designated time interval mentioned above is inputted from the operator panel 214. For example, in case that a user wants to print out another print job after 10 minutes of a current print job of the user and wants to have a banner page in another print job like another print job belongs to another user, the user inputs a time interval of less than 10 minutes to the time interval managing section 421 via the operator panel 214, and the time interval of less than 10 minutes is made to memorize in the time interval managing section 421.

The time interval managing section 421 counts a time passed from the time that previous print job time was memorized in the user information memorizing section 211, when the passed time becomes more than the designated time, for example, 10 minutes, the previous user information memorized in the user information memorizing section 211 is deleted. With this process, at the time after the designated time is passed, the user information comparing section 212 judges that the user of the print job of this time is different from the user of the print job of previous time, and the banner page is printed out.

FIG. 4 is a block diagram showing a structure of a second embodiment of a printer system of the present invention. The difference between the first and second embodiments is that a user information memorizing section 311, a user information comparing section 312, and a banner page controller 313 are in a print server 308 at the second embodiment. The client 207 of the second embodiment is the same as that of the first embodiment.

At the second embodiment, the client 207, the print server 308, and a printer 320 are connected to the network 201. The functions of the print server 308 and the printer 320 are different from those of the first embodiment.

The print server 308 consists of a communication controller 322 which connects to the network 201, a CPU 321, the user information memorizing section 311 for memorizing the user information in the print job, the user information comparing section 312 which compares the user information memorizing in the user information memorizing section 211 with the user information in the print job sent newly, and the banner page controller 313 which makes a banner page including the user information print.

The printer 320 consists of an operator panel 314 on which a user operates, a printer engine 318 which is a printing mechanism of the printer 320, and a controller 319. And the controller 319 consists of a CPU 309, a network interface (I/F) 310 for connecting to the network 201, a ROM 315 in which operating programs simpler than the first embodiment are stored, a RAM 316 in which data to be printed out is stored temporarily, and a video interface (I/F) 317 which informs data to be printed to the printer engine 318, When a user instructs to print a document from the client 207 of the second embodiment shown in FIG. 4, the client 207 sends a print job attached user information to the print server 308. When the print server 308 receives the print job, the print server 308 judges whether a banner page must be printed out or not, corresponding to the flowchart shown in FIG. 2. In case that it is necessary to print out the banner page, the print server 308 newly makes a print job to print out the banner page, and sends the newly made print job to the printer 320, by separating the print job sent from the client 207, with this process, the banner page is printed out.

At this second embodiment, a conventional printer can be used as the printer 320. And it does not need to add new functions to the conventional printer.

According to the present invention, in case that a banner page is outputted for a printer connected to a network, when a user instructs to print out plural print jobs in succession, the banner page is outputted at one page front of the first print job of the plural print jobs. And when another user instructs to print out another print job after the user instructed, the banner page is printed out on one page front of another print job. With this process, the user can easily recognize his/her own printed documents and unnecessary banner pages are not printed, therefore, the cost can be reduced.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A method of managing the printing of client identification banners on a network printer which receives a succession of print jobs from one or more clients connected to the network, the method comprising the steps of:

receiving a print job from a network client, together with client identification information;

comparing the client identification information for the received print job with client identification information for the previously received print job; and, if the client identification information for the current print job is different from that for the previous print job:

generating a client identification banner corresponding to the client identification information for the current print job;

printing the client identification banner together with the print job; and saving the client identification information for the current print job.

2. The method of managing the printing of client identification banners as described in claim 1, further including the steps of:

determining the time interval between receipt of the current print job and the previous print job; and if the time interval exceeds a predetermined threshold, and irrespective of whether the client identification information for the current print job is different from the client identification information, for the previous print job:

generating a client identification banner corresponding to the client identification information for the currently print job;

printing the client identification banner together with the print job; and saving the client identification information for the current print job.

3. The method of managing the printing of client identification banners as described in claim 2, in which the step of printing the client identification banner is comprised of printing a banner page preceding the first page of the print job.

4. The method of managing the printing of client identification banners as described in claim 2, in which the step of printing the client identification banner is comprised of printing a banner page following the last page of the print job.

5. The method of managing the printing of client identification banners as described in claim 2, in which the step of printing the client identification banner is comprised of printing the banner on one of the pages of the print job.

6. The method of managing the printing of client identification banners as described in claim 2, further including the step of adjusting the predetermined threshold in response to a user command.

7. The method of managing the printing of client identification banners as described in claim 1, in which the step of printing the client identification banner is comprised of printing a banner page preceding the first page of the print job.

8. The method of managing the printing of client identification banners as described in claim 1, in which the step of printing the client identification banner is comprised of printing a banner page following the last page of the print job.

9. The method of managing the printing of client identification banners as described in claim 1, in which the step of printing the client identification banner is comprised of printing the banner on one of the pages of the print job.

10. The method of managing the printing of client identification banners as described in claim 1, in which the step of receiving print jobs is comprised of receiving the print jobs by a print server connected to the network.

11. The method of managing the printing of client identification banners as described in claim 10, in which the steps of comparing the client identification information, generating the client identification banner and saving the client identification information for the current print job are all performed by the print server.

12. The method of managing the printing of client identification banners as described in claim 11, further including the step of transmitting the generated client identification banner along with the print job from the print server to the printer.

13. The method of managing the printing of client identification banners as described in claim 12, further including the steps of:

determining the time interval between receipt of successive print jobs; and if the time interval exceeds a predetermined threshold, irrespective of whether the client identification information for the current print job is different from the client identification information for the previous print job:

generating a client identification banner corresponding to the client identification information for the current print job;

printing the client identification banner together with the print job; and saving the client identification information stored for the current print job.

14. A printer adapted to be connected to a network for shared use by a plurality of network clients, the printer comprising:

an interface unit for receiving print jobs and client identification information from network clients;

a memory for client identification information;

a circuit which compares the client identification information for a current print job with client identification information stored in the memory for the previous print job;

a print controller;

a print engine; and a central processing unit (CPU), the CPU being operative; if the client identification information for the current print job is different from the stored client identification information in the memory, to instruct the print controller to generate a client identification banner corresponding to the client identification information for the current print job;

to instruct the print engine to print the client identification banner for the current print job together with the print job; and to replace the client identification information stored in the memory with the client identification information for the current print job.

15. The printer as described in claim 14, further including:

a time interval management circuit which determines the time interval between receipt of successive print jobs, the CPU being operative, if the time interval exceeds a predetermined threshold and irrespective of whether the client identification information for the current print job is different from the client identification information in the memory:

to instruct the print controller to generate a client identification banner corresponding to the client identification information for the current print job;

to instruct the print engine to print the client identification banner together with the print job; and to replace the client identification information stored in the memory with the client identification information for the current print job.

16. A printer system comprised of a print server and a printer adapted to be connected to a network for shared use by a plurality of network clients, the print server comprising:

a first interface unit for receiving print jobs and client identification information from network clients;

a memory unit for storing client identification information;

a circuit which compares the client identification information for a current print job with client identification information stored in the memory for the previous print job;

a print controller, and a first central processing unit (CPU), the CPU being operative; if the client identification information for the current print job is different from the client identification information in the memory, to instruct the print controller to generate a client identification banner corresponding to the client identification information for the current print job;

to transmit control commands and the client identification banner generated by the print controller for the current print job, together with the associated print job, to the printer;

to instruct the printer to print the client identification banner for the current print job together with the print job; and to replace the client identification information stored in the memory with the client identification information for the current print job, the printer comprising:

a second interface unit which receives data from the print server;

a print engine; and a second CPU for controlling the operation of the printer, the second CPU being operative to control the print engine in response to commands from the first CPU.

17. The printer as described in claim 16, in which the print server is further comprised of:

a time interval management circuit which determines the time interval between successive print jobs, the first CPU being operative, if the time interval exceeds a predetermined threshold, and irrespective of whether the client identification information for the current print job is different from the client identification information in the memory, to instruct the print controller to generate a client identification banner corresponding to the client identification information for the current print job;

to transmit the client identification banner generated by the print controller to the printer together with the associated print job;

to instruct the printer to print the client identification banner together with the print job; and to replace the client identification information in the memory with the client identification information for the current print job.

* * * * *